United States Patent [19]
Corrigan

[11] Patent Number: 5,696,734
[45] Date of Patent: Dec. 9, 1997

[54] METHOD AND SYSTEM FOR ELIMINATING GHOST REFLECTIONS FROM OCEAN BOTTOM CABLE SEISMIC SURVEY SIGNALS

[75] Inventor: Dennis Corrigan, Plano, Tex.

[73] Assignee: Atlantic Richfield Company, Los Angeles, Calif.

[21] Appl. No.: 640,089

[22] Filed: Apr. 30, 1996

[51] Int. Cl.$^6$ .............................. G01V 1/38; G01V 1/24
[52] U.S. Cl. .................. 367/24; 367/22; 364/421
[58] Field of Search .................. 367/22, 24; 364/421

[56] References Cited

U.S. PATENT DOCUMENTS

| | | | |
|---|---|---|---|
| 4,355,214 | 10/1982 | Levy et al. | 179/170.2 |
| 4,486,865 | 12/1984 | Ruehle | 367/24 |
| 4,520,467 | 5/1985 | Berni | 367/24 |
| 4,561,074 | 12/1985 | Warmack | 367/46 |
| 4,561,075 | 12/1985 | Smith et al. | 367/46 |
| 4,979,150 | 12/1990 | Barr | 367/24 |
| 5,163,028 | 11/1992 | Barr et al. | 367/13 |
| 5,365,492 | 11/1994 | Dragoset, Jr. | 367/21 |
| 5,524,100 | 6/1996 | Paffenholz | 367/24 |

OTHER PUBLICATIONS

Barr and Sanders, "Attenuation of Water-Column Reverberations Using Pressure and Velocity Detectors in a Water-Bottom Cable", *presented at 59th Annual Meeting of the Society of Exploration Geophysicists*, (SEG, 1989).

Robinson, "Predictive Decomposition of Seismic Traces", *Geophysics*, vol. XXII, No. 4 (1957), pp. 767–778.

Ball et al, 66th Annu. SEG Int. Abts. (Denver) Nov. 10, 1996, vol. 1, pp. 28–31, ACQ1–8.

*Primary Examiner*—Nelson Moskowitz
*Attorney, Agent, or Firm*—Anderson, Levine & Lintel

[57] ABSTRACT

A computer system and method for eliminating the effects of ghost reflections from marine seismic survey traces obtained via ocean bottom cables are disclosed. Dual sensors are used in the ocean bottom cables, to obtain both pressure and velocity traces. The disclosed method combines, in a common receiver gather, the corresponding pressure and velocity traces for each source-receiver path using several values of a scalar value that serves as a weighting factor. Conventional corrections and filtering, including spiking deconvolution, are applied to the combined traces, and the combined traces for each value of the scalar are stacked over a limited offset range. Autocorrelation and other spectral techniques may be applied to identify the residuals of the ghost reflections using each of the multiple scalar values; the optimal value may then be selected, for each common receiver gather, as that which has the minimum ghost reflection residuals. The combined traces for each common receiver gather are then used in conventional survey generation.

19 Claims, 10 Drawing Sheets

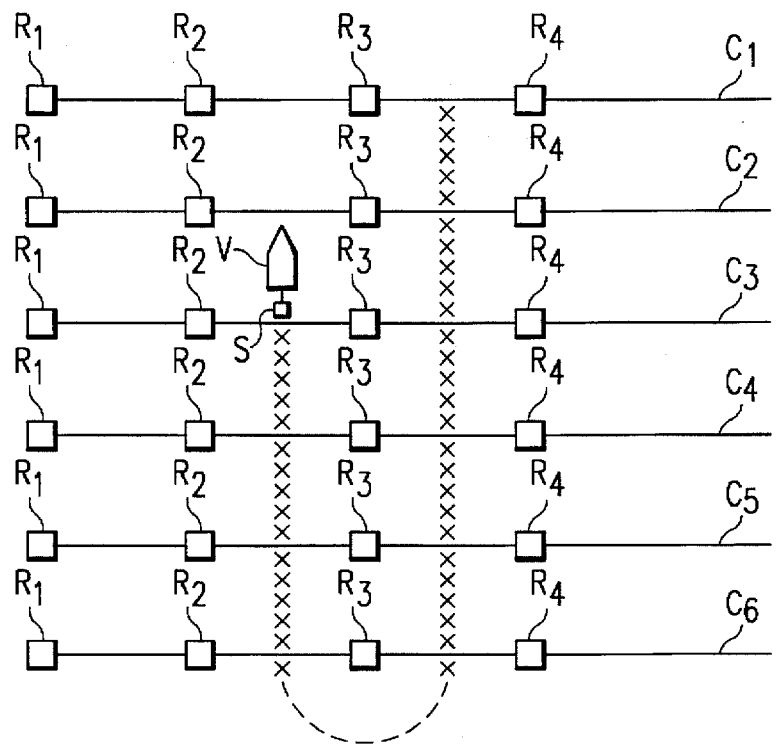
FIG. 2
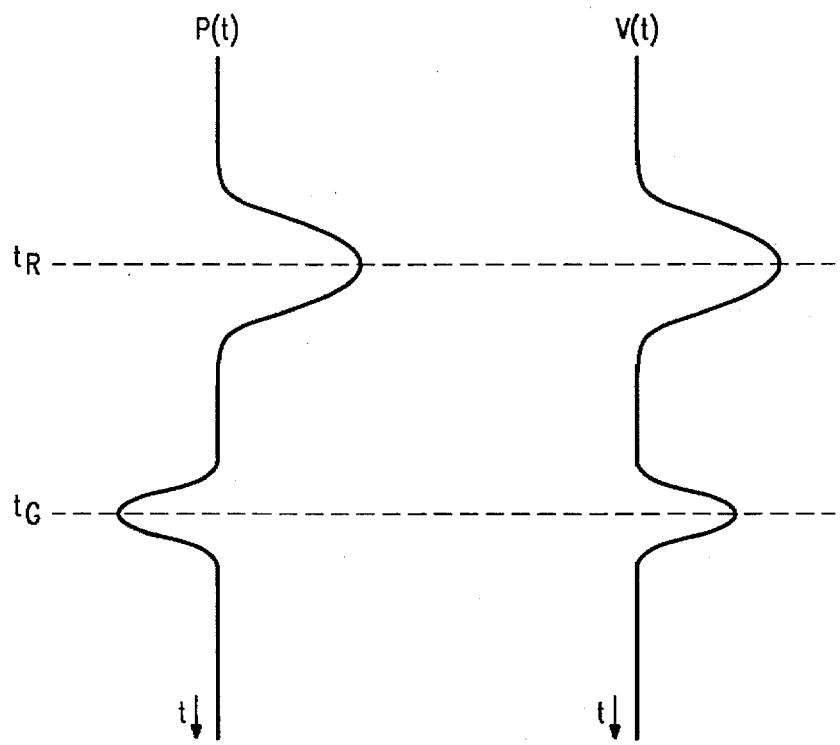
FIG. 3a
FIG. 3b

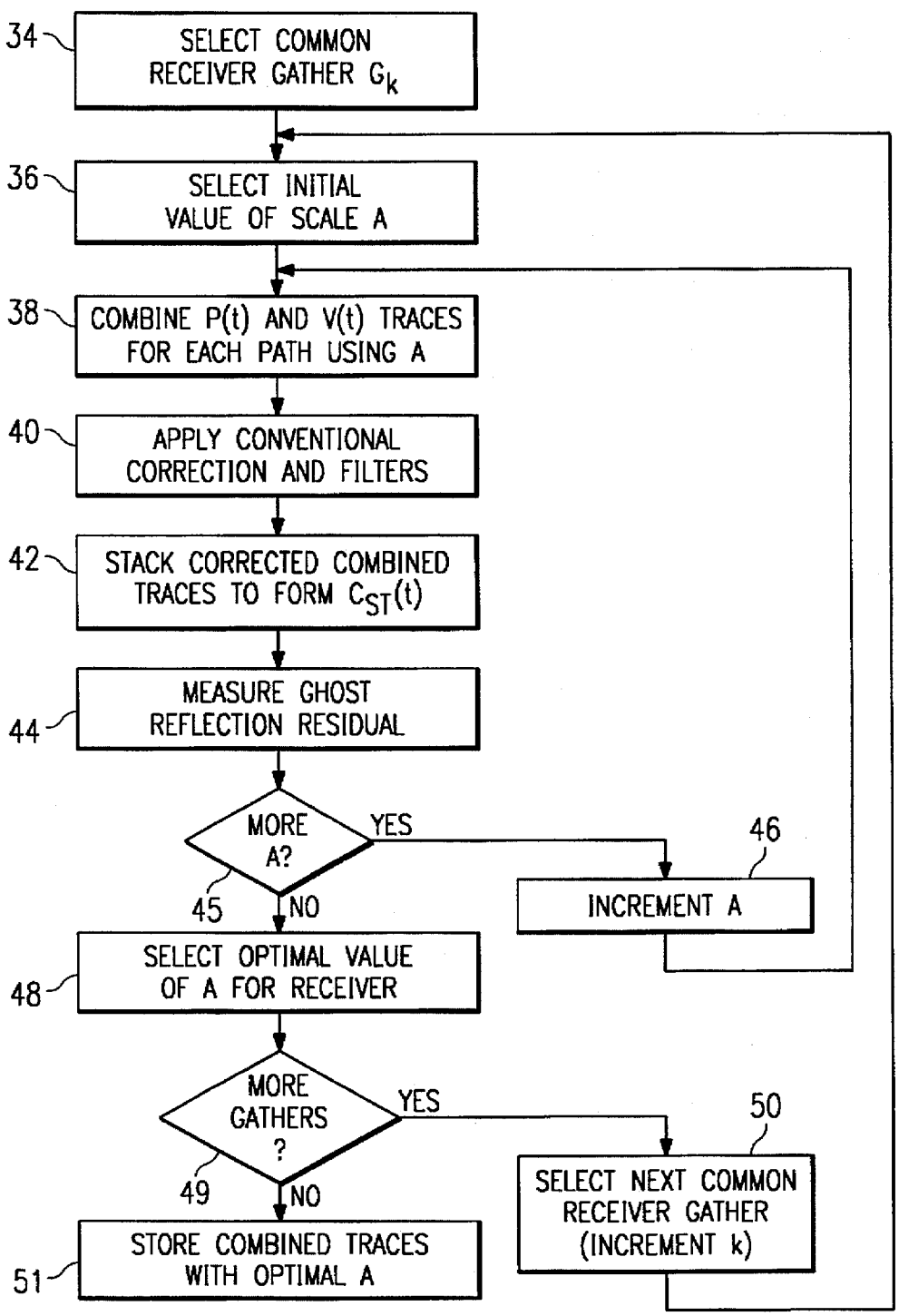

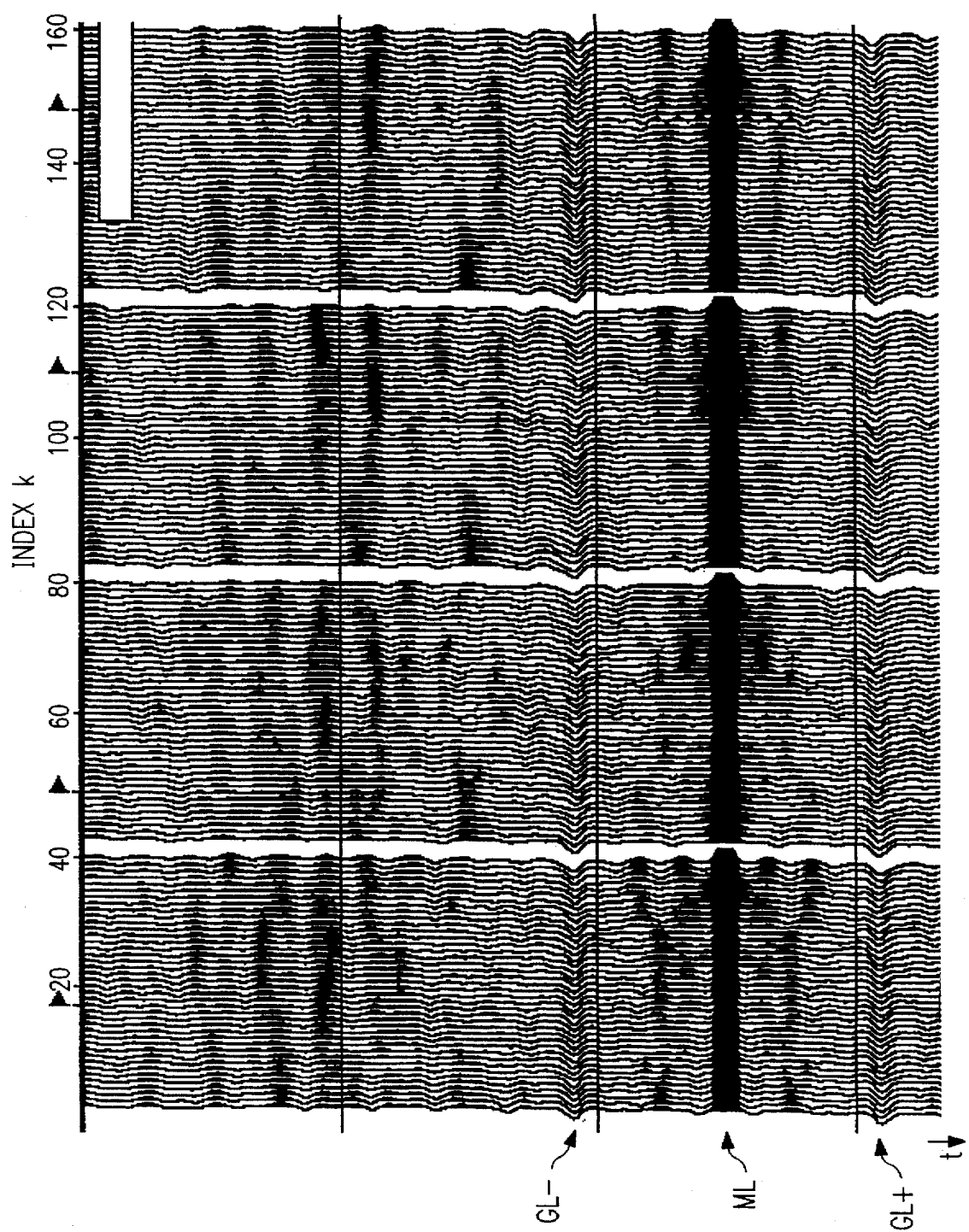

(A=1.0)

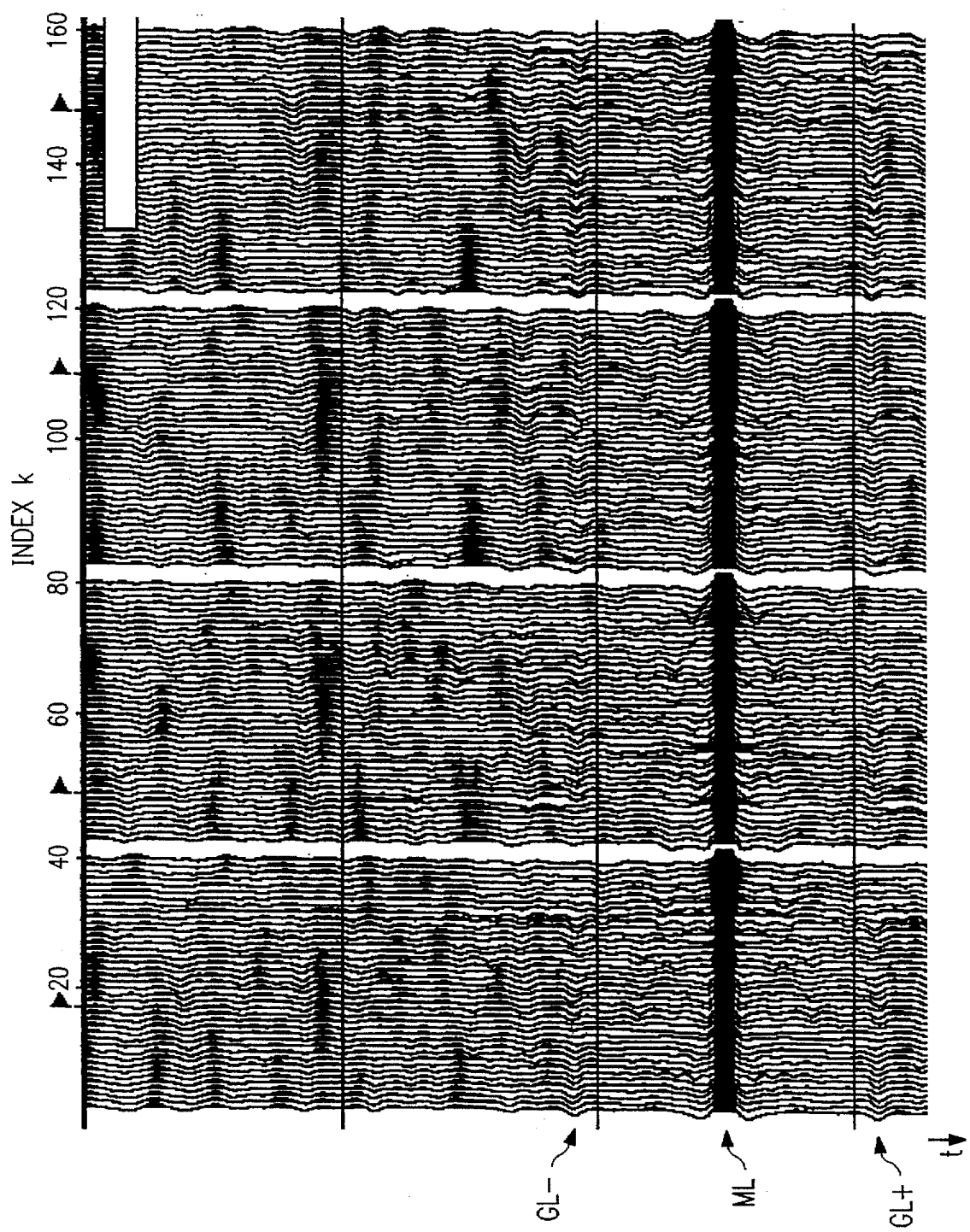

(A=0.667)

(A=0.75)

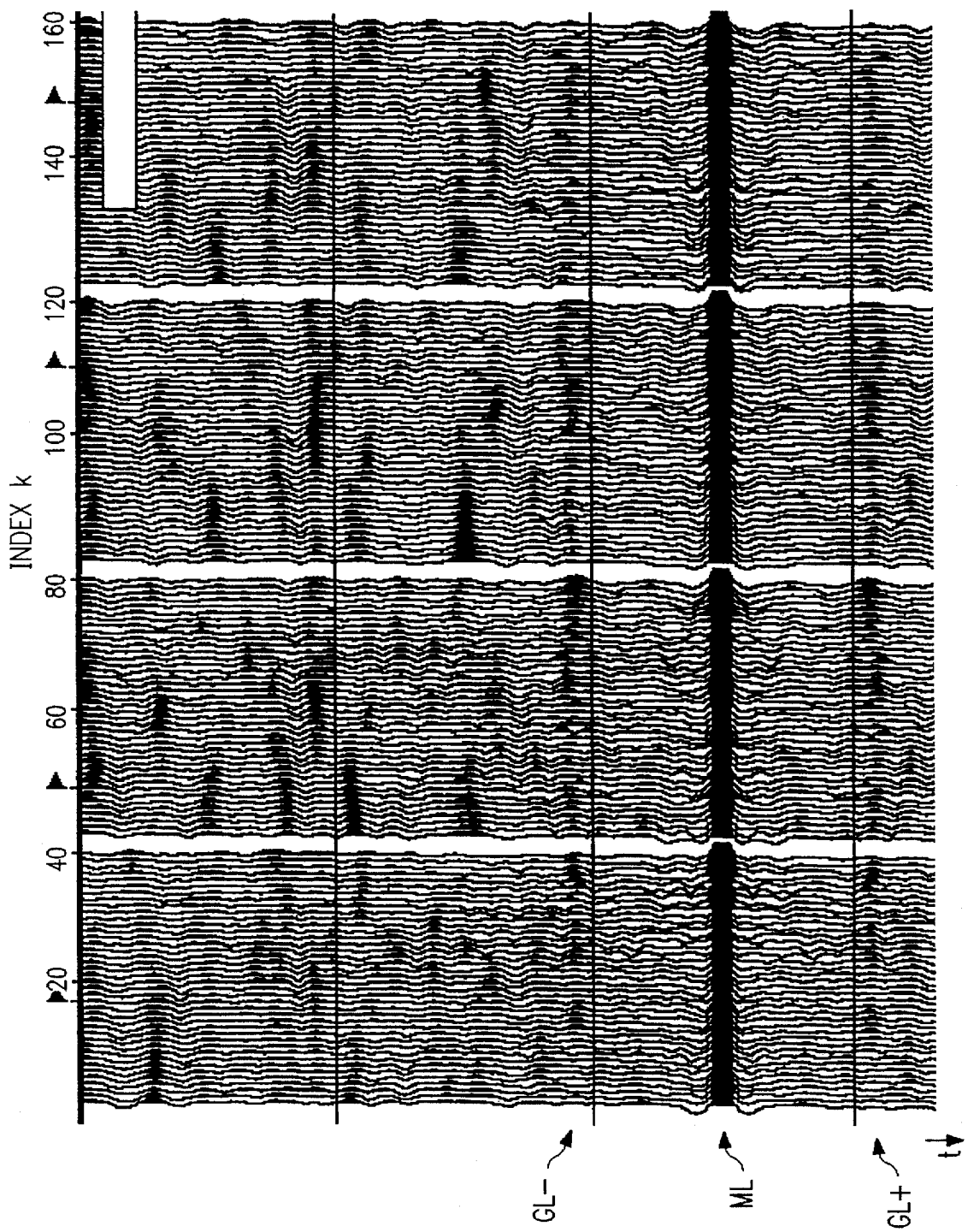
FIG. 7f (A=0.8)

5,696,734

METHOD AND SYSTEM FOR ELIMINATING GHOST REFLECTIONS FROM OCEAN BOTTOM CABLE SEISMIC SURVEY SIGNALS

This invention is in the field of seismic prospecting for hydrocarbon reserves, and is more specifically directed to methods of eliminating false, or ghost, reflection artifacts from marine seismic survey traces.

BACKGROUND OF THE INVENTION

In the field of marine seismic prospecting, many surveys are performed using ocean bottom cable technology. According to this approach, acoustic detectors are deployed at fixed locations at or near the ocean bottom, and an acoustic source is towed near the ocean surface. The acoustic source imparts acoustic energy into the water that is reflected from geological strata and interfaces below the ocean bottom. These reflections, detected by the acoustic detectors, indicate the depth and location of the reflecting geological features. Ocean bottom cable technology provides the important advantage, over towed detector techniques, of providing survey ability in crowded offshore regions, such as may be encountered near offshore drilling and production platforms (which are often present, of course, near important hydrocarbon reserves). The incremental cost of additional passes through the survey region is also relatively low, considering that hydrophone streamers are not being towed by the source vessel.

As is well known in the field of marine seismic surveying, however, so-called ghost reflections are present in the signals detected by the ocean bottom cable detectors. Referring now to FIG. 1, a conventional ocean bottom cable survey is illustrated, for purposes of explaining the ghost reflection mechanism. As shown in FIG. 1, vessel V at surface SF of ocean O is towing a source S that is periodically activated to produce acoustic waves; cable C is in place, having multiple receiver locations R, each location R having both a hydrophone H for detecting pressure waves and a geophone G for detecting velocity of the wave (i.e., particle motion). As shown in FIG. 1, source S has imparted an acoustic wave W that has traveled downwardly and has been reflected from the interface I between formations 2 and 4. The reflected wave W' is detected by receiver locations R (e.g., receiver location $R_2$), which generates electrical signals that are forwarded to the receiving station (not shown) via cable C. However, the reflected wave W' continues to travel through the water until it reaches the surface SF, at which it is again reflected (wave W") and travels back to receiver locations R, where it is again detected by the hydrophones H and geophones G, for example as shown at receiver location $R_2$.

As is evident from FIG. 1 and as is fundamental in the art, the ghost reflection from the water surface to the receiver (e.g., wave W") does not provide any useful information regarding the location or attributes of the interface between subsurface strata 2, 4, but instead merely provides noise in the true reflection signal. The distance between bottom receiver locations R and the surface of the water from which the ghost reflections emanate exacerbate the problem of ghost reflections, since the travel time from the surface to the receiver locations R may be sufficiently long as to cloud the presence of deeper subsurface strata. Ghost reflection effects have been observed to be especially severe for ocean bottom cables used in ocean depths of 10 meters and greater, generally requiring substantial alterations in acquisition and processing techniques to obtain meaning subsurface survey information.

Many techniques have been used to attempt to remove the effects of ghost reflections from marine surveys, especially of the ocean bottom cable type. The arrangement of FIG. 1 illustrates one approach, through use of both hydrophones H and geophones G at each receiver location R. As described in U.S. Pat. Nos. 4,486,865 and 5,365,492, the true reflection from the subsurface feature has a positive polarity as detected by both hydrophone H and geophone G. As described therein, the ghost reflection, however, has a negative polarity as detected by geophone G due to the inverting effect upon velocity waves at the reflecting water surface, while the ghost reflection has a positive polarity as detected by hydrophone H. Theoretically, combining of the geophone and hydrophone signals should reinforce the signal while canceling the ghost reflection artifacts.

Use of dual sensor bottom cables to eliminate ghost reflection effects has encountered difficulties according to conventional techniques, however, particularly in selecting the proper combination of pressure amplitude and velocity amplitude to properly eliminate the ghost reflection effects over a relatively large survey area. By way of further background, specialized acquisition techniques have been used in estimating the optimal combination for ghost reflection suppression, as described in Bart and Sanders, "Attenuation of Water-Column Reverberations Using Pressure and Velocity Detectors in a Water-Bottom Cable", presented at the 59th Annual Meeting of the Society of Exploration Geophysicists (1989). Other known approaches have been implemented in seismic processing software, as described in U.S. Pat. Nos. 4,486,865 and 5,365,492.

It is an object of the present invention to provide a method and system for eliminating ghost reflection effects from marine seismic survey signals in an optimal manner for each receiver in the survey.

It is a further object of the present invention to provide such a method and system in which specialized acquisition techniques are not required.

It is a further object of the present invention to provide such a method and system in which stacked data may be utilized in the optimization, to obtain additional noise suppression.

It is a further object of the present invention to provide such a method and system that is compatible with conventional deconvolution filtering to further improve the signal-to-noise ratio.

Other objects and advantages of the present invention will be apparent to those of ordinary skill in the art having reference to the following specification together with its drawings.

SUMMARY OF THE INVENTION

The invention may be incorporated into a digital computer for analyzing marine seismic survey data such as may be collected from an ocean bottom cable arrangement, using dual (pressure and velocity) sensors at each receiver location. Candidate scalar values for weighting of the pressure and velocity are selected. Each candidate scalar value is applied to combine the pressure and velocity traces associated with each source-receiver path in a common receiver gather of traces, such that each trace in the gather becomes a composite pressure and velocity trace using the candidate scalar value. Conventional processing is then applied to the gather of composite traces, preferably including spiking deconvolution and normal move-out correction. A local image of the subsurface is then obtained by stacking the corrected composite traces of the common receiver gather over a limited offset range. The residual effect of the ghost reflections is measured, for example as a spectral measurement of harmonics from the autocorrelation of the stacked combined traces. The optimum scalar value for the common receiver gather is determined from a comparison of the measured residuals. The process is repeated for each receiver location in the survey.

BRIEF DESCRIPTION OF THE DRAWINGS

FIG. 2 is a plan view of a marine survey using ocean bottom cables, in connection with which the preferred embodiment of the invention may be used.

FIGS. 3a and 3b are pressure and velocity traces, respectively, illustrating the behavior of ghost reflections upon signals of each type.

FIG. 5 is a flow chart illustrating the operation of the method according to the preferred embodiment of the invention.

FIGS. 7a through 7f are sections of autocorrelations of limited-offset stacks of combined traces of varying scalar value, illustrating an example of the results of the method according to the preferred embodiment of the invention.

DETAILED DESCRIPTION OF THE PREFERRED EMBODIMENT

Figure 1:
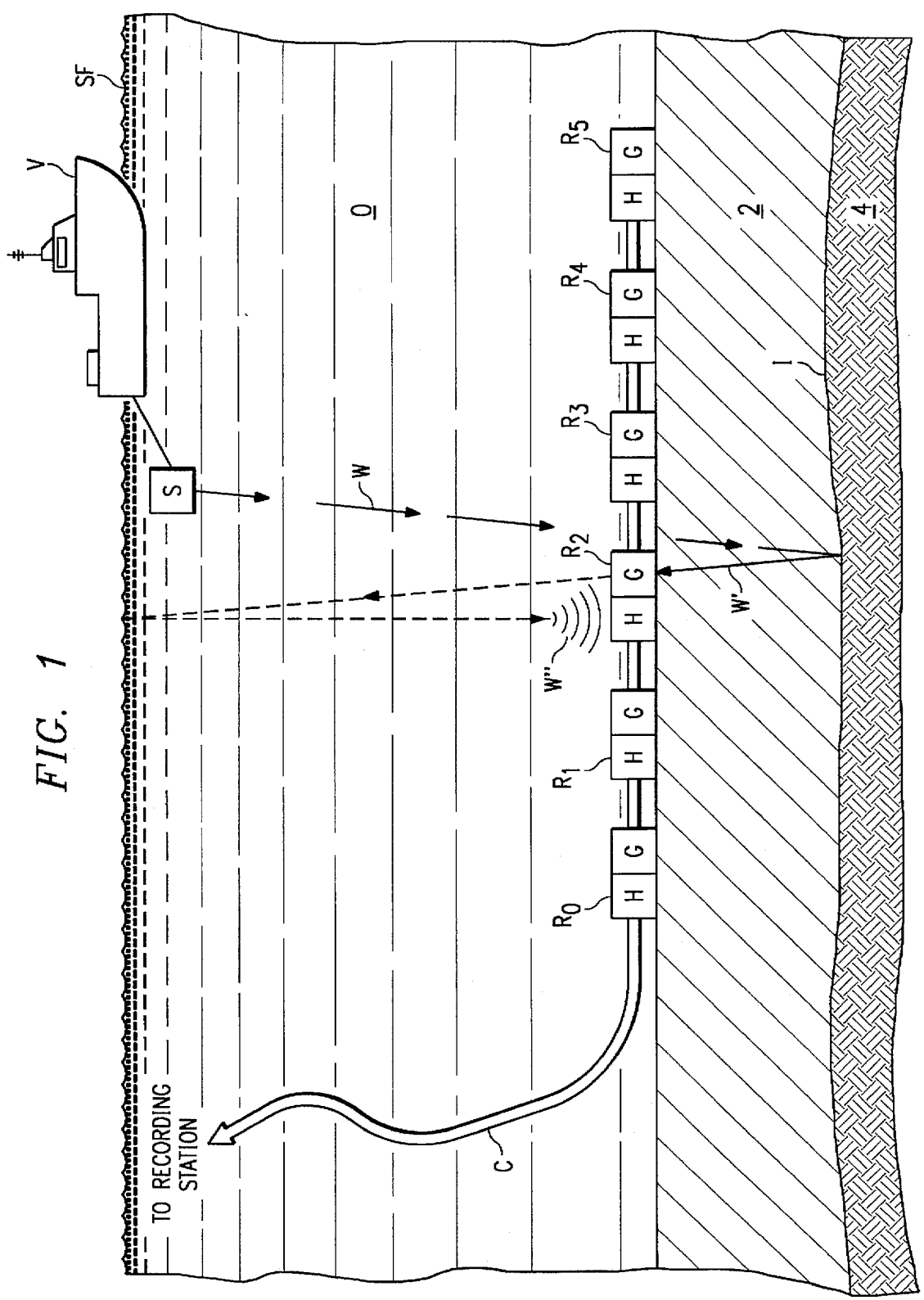
FIG. 1 is a schematic elevation and cross-sectional view of a marine region at which a seismic survey is being performed using a dual sensor ocean bottom cable, according to both conventional techniques and according to the preferred embodiment of the invention.

As will become apparent from the detailed description of the preferred embodiment of the invention provided hereinbelow, the present invention is directed to the optimization of signals from dual sensor marine seismic surveys, particularly those using ocean bottom cables, which are especially susceptible to severe ghost reflection effects. The present invention is useful with a multitude of marine survey designs (i.e., the arrangement of the receiver locations relative to the source shots). For purposes of clarity, however, the preferred embodiment of the invention will be described in the context of a simple ocean bottom cable marine survey as illustrated in FIG. 2, to which attention is now directed.

FIG. 2 is a plan view of a typical marine seismic survey in connection with which the preferred embodiment of the invention may be used. In the survey of FIG. 2, six cables $C_1$ through $C_6$, each having multiple dual sensor receiver locations R, are deployed over the survey area. While only four receiver locations, $R_1$ through $R_4$, are shown for each cable $C_1$ through $C_6$ in FIG. 2 for the sake of clarity, ocean bottom cables typically include many more receiver locations, for example on the order of forty per cable. Each of cables $C_1$ through $C_6$ is deployed substantially as illustrated for the single cable C of FIG. 1. Each receiver location R in the survey of FIG. 2 is associated with both a geophone and also a hydrophone, similarly as described hereinabove relative to FIG. 1, so that both velocity and pressure measurements may be made at each receiver location R in the seismic survey. Vessel V tows acoustic source S along multiple paths above cables $C_1$ through $C_6$, typically perpendicularly thereto. Source S is activated at multiple locations (each indicated by an X in FIG. 2) along each path, directing an acoustic wave substantially downward toward the ocean bottom at each location. Each receiver location R in each of cables $C_1$ through $C_6$ will thus receive direct and reflected acoustic energy emanating from each activation of source S, resulting in multiple traces of both pressure and velocity measurements over time. The reflected energy will include both the desired reflections from geological features, and also the ghost reflections from the water surface, as described hereinabove.

As noted hereinabove, dual sensor ocean bottom cable technology may be used to distinguish subsurface geological reflections from ghost reflections. FIGS. 3a and 3b are examples of pressure P(t) and velocity V(t) measurements over time made at a common receiver location responsive to a single shot, for purposes of explanation. Reflections from geological features (e.g., wave W' in FIG. 1) will appear as positive amplitude signal for both pressure and velocity measurements, as shown in FIGS. 3a and 3b at time $t_R$. A ghost reflection from the water surface (e.g., wave W" in FIG. 1) appears as a negative amplitude sidelobe in the pressure trace P(t) at time $t_G$, but appears as a positive amplitude sidelobe in the velocity trace V(t) at time $t_G$. Typically, as will be described hereinbelow, another sidelobe due to ghost reflections will be present in each trace later in time than the actual reflection event at time $t_R$. The opposing polarity for pressure and velocity ghost reflections results from the necessary boundary conditions for upward traveling pressure and velocity waves that reflect from the surface of the water. In the pressure case, since the water is a free surface, boundary conditions require that the sum of the pressure of the incident and reflected waves be zero, thus requiring that the reflected pressure wave have a negative amplitude relative to that of the incident upward traveling wave. In the velocity case, boundary conditions require equality between the upgoing and downgoing velocities, which forces the ghost reflection to have the same polarity as that of the incident upward traveling wave. These effects are evident in the traces of FIGS. 3a and 3b.

As such, one could theoretically add the pressure trace P(t) and the velocity trace V(t) to one another to cancel the ghost reflections at time to and reinforce the signal pulses at time $t_R$. However, as suggested by FIGS. 3a and 3b, the absolute value of the amplitude of the pressure and velocity pulses at time to are not equal to one another. As such, simple addition of the two traces will not be sufficient to eliminate the ghost reflections. As such, the ideal sum C(t) of the pressure and velocity traces, namely that which minimizes the ghost reflections, will have the following form:

$$C(t) = (1-A) + AV(t)$$

where A is a scalar having a value between 0 and 1.

It has been observed, in connection with the present invention, that the value of the optimal scalar A varies with receiver location. This variation is due primarily to variations in the reflectivity of the seafloor (i.e., the impedance contrast between the ocean bottom and the water) among the receiver locations in the survey. Physical factors such as the depth of the dual sensor beneath the water surface, and physical coupling of the dual sensor to the ocean bottom, may also cause variations in the optimal scalar A among receiver locations. Because of these variations, optimization of the value of the scalar A over a survey is quite cumbersome according to conventional techniques.

A method of selecting the optimal value of the scalar a for a marine ocean bottom cable seismic survey according to the preferred embodiment of the invention will be described in detail hereinbelow. Prior to such description, however, an exemplary computer system which is suitable for use in connection with the present invention will now be described relative to FIG. 4.

Figure 4:
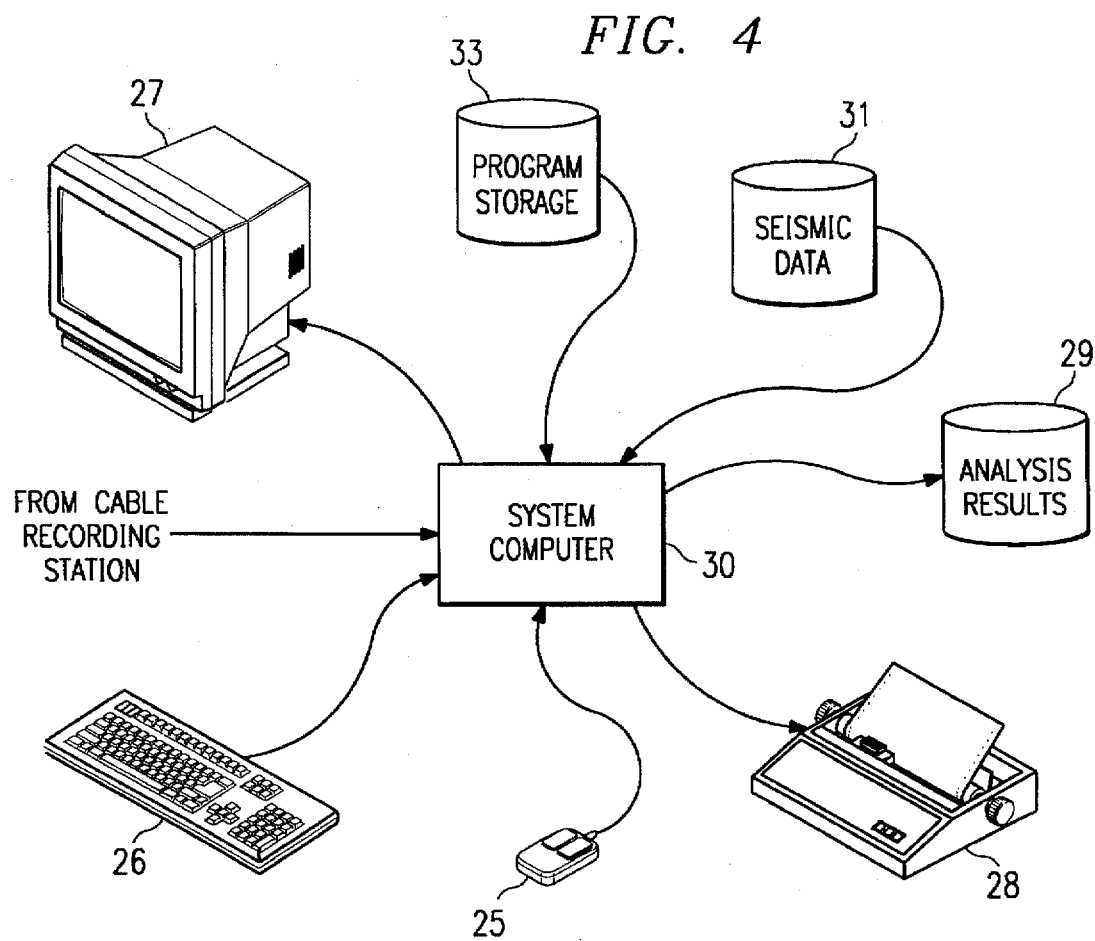
FIG. 4 is an electrical diagram, in block form, of a computer system programmed to perform the method according to the preferred embodiment of the invention.

The system of FIG. 4 includes system computer 30, which may be implemented as any conventional personal computer or workstation, preferably a UNIX-based workstation such as a SPARCstation available from Sun Microsystems, Inc., implemented either in standalone fashion or as part of a network arrangement. System computer 30 is in communication with disk storage devices 29, 31, and 33, which are preferably external hard disk storage devices in a network. It is contemplated that disk storage devices 29, 31, 33 are conventional hard disk drives, and as such will be implemented by way of a local area network or by remote access. Of course, while disk storage devices 29, 31, 33, are illustrated as separate devices, a single disk storage device may of course be used to store any and all of the program instructions, measurement data, and results as desired.

In this embodiment of the invention, signals from both the hydrophones and geophones at receiver locations R in cables $C_1$ through $C_6$ of FIG. 2 are stored in digital form on disk storage device 31. System computer 30 can then retrieve the appropriate data from disk storage device 31 to perform the analysis of the preferred embodiment of the present invention, according to program instructions that correspond to the method described hereinbelow. For operation on system computer 30, the program instructions are written in the form of a computer program (e.g., in C++ or in any other suitable language) stored in computer-readable memory, such as program disk storage device 33 of FIG. 4; of course, the memory medium storing the computer program may be of any conventional type used for the storage of computer programs, including hard disk drives, floppy disks, CD-ROM disks, magnetic tape, and the like.

According to the preferred embodiment of the invention, system computer 30 presents output primarily onto graphics display 27, or alternatively via printer 28; further in the alternative, system computer 30 may store the results of the analysis described hereinbelow on disk storage 29, for later use and further analysis. Keyboard 26 and pointing device (e.g., a mouse, trackball, or the like) 25 are provided with system computer 30 to enable interactive operation. As noted, system computer 30 is able to communicate with disk storage devices 29, 31, including external hard disk storage on a network and floppy disk drives. System computer 30 is typically located at a data center remote from the survey region.

In the example of a marine survey, as shown in FIG. 1, system computer 30 is in communication with the geophones and hydrophones at receiver locations R in cables $C_1$ through $C_6$ (generally via a recording station, not shown), to receive signals indicative of the reflected acoustic energy received in the survey. As evident from the presence of both geophones and hydrophones, the signals received by system computer 30 will correspond to both velocity and pressure measurements over time generated at each receiver location R in the survey. These signals, after conventional formatting and other initial processing, are stored by system computer as digital data in disk storage 31 for subsequent retrieval and processing in the manner described hereinbelow. While FIG. 4 illustrates disk storage 31 as directly connected to system computer 30, it is also contemplated that disk storage device 31 may be accessible through a local area network or by remote access. Furthermore, while disk storage devices 29, 31 are illustrated as separate devices for storing input seismic data and analysis results, respectively, disk storage devices 29, 31 may of course be implemented within a single disk drive (either together with or separately from program disk storage device 33), or in any other conventional manner as will be fully understood by one of skill in the art having reference to this specification.

Referring now to FIG. 5, a method of analyzing the pressure and velocity signals detected at receiver locations R in a seismic survey, according to the preferred embodiment of the present invention, will now be described in detail.

The method begins with process 34, in which system computer 30 retrieves, from disk storage device 31, digital data corresponding to multiple pressure traces P(t) and multiple velocity traces V(t) detected by a selected one of the receiver locations R in the survey region. These multiple traces will, of course, correspond to acoustic energy imparted into the survey region by source S from multiple shot locations (indicated by Xs in the example of FIG. 2), and thus correspond to reflections (and ghost reflections) due to energy traveling along multiple paths to the selected receiver location R. These multiple traces, all associated with the same receiver location R, are commonly referred to in the art as a common-receiver gather. It is contemplated, for purposes of the present invention, that the traces selected and retrieved in process 34 will correspond to shot locations within a relatively small offset range, for example on the order of 500 meters, from receiver location R in the survey Of course, process 34 may alternatively be performed by system computer 30 retrieving, from disk storage device 31, digital data corresponding to pressure and velocity traces measured at multiple receiver locations R, following which system computer 30 selects the common-receiver gather from the retrieved digital data. In either case, a common-receiver gather $G_k$ of data results from process 34 according to this preferred embodiment of the invention. The balance of pressure and velocity data is preferably optimized by receiver location, according to the present invention, as it is believed that receiver locality plays the dominant role in the determination of this balance.

Following selection of common-receiver gather $G_k$ in process 34, system computer 30 next performs process 36 in which it selects an initial value $A_i$ of the scalar A to be used in combining the pressure traces P(t) and velocity traces V(t) for each shot path in gather $G_k$. As described hereinabove, the method according to the preferred embodiment of the invention is directed to optimization of the scalar value A in a combined pressure-velocity trace C(t) based upon the following sum, for each receiver location R in the survey:

$$C(t)=(1-A)P(t)+AV(t)$$

Process 36 thus selects an initial value $A_i$ of scalar A for use in the first pass through the evaluation process described hereinbelow. Since A can range from 0 to 1, process 36 preferably selects one of the extreme values for iterative value $A_i$, for example $A_i=0$.

System computer 30 next performs process 38 to combine the pressure and velocity traces for each source point to one another using the value $A_i$ selected in process 36. Accordingly, process 38 combines these traces for each source point in common receiver gather $G_k$, according to the following sum illustrated for the jth source point in gather $G_k$:

$$C_j(t)=(1-A_i)P_j(t)+A_iV_j(t)$$

One such combined trace $C_j(t)$ is thus produced by system computer 30 in process 38 for each source point j in the common receiver gather.

Process 40 then applies conventional correction and filtering to each of the prestack combined traces $C_j(t)$ in the current common receiver gather. Certain conventional correction and filtering has been observed to be particularly beneficial in connection with the preferred embodiment of the present invention, as will now be described relative to FIG. 6.

Figure 6:
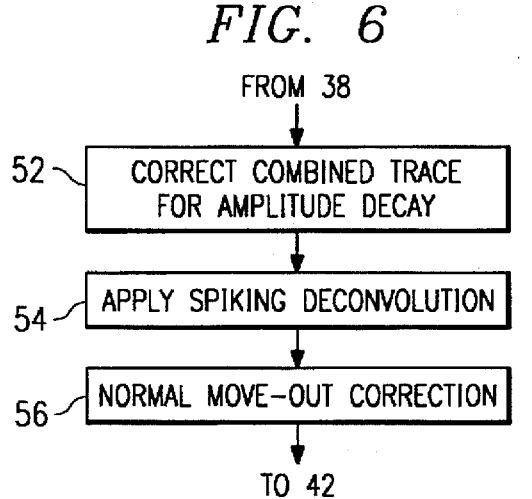
FIG. 6 is a flow chart illustrating, in detail, certain conventional processing steps used in the method according to the preferred embodiment of the invention.

Process 40 begins by system computer 30 performing amplitude decay correction upon each of the combined traces $C_j(t)$, illustrated in FIG. 6 as process 52. Process 52, in effect, corrects the amplitude behavior of each combined trace $C_j(t)$ over time, so as to compensate for amplitude decay expected from wave propagation effects.

In process 54, system computer 30 next applies a predictive filter by way of predictive decomposition of the compensated combined traces $C_j(t)$ from process 52. According to the preferred embodiment of the invention, the predictive filter of process 52 is of the type commonly known as spiking deconvolution. Spiking deconvolution is a well-known filtering technique in the art, by way of which seismic signals are processed to compress the predictable energy from a reflection event in the time (or depth) domain, thus improving the resolution of the traces. Spiking deconvolution thus amplifies the trace at those locations corresponding to reflections of the wavelet, and attenuates the trace activity elsewhere, thus increasing the resolution of the trace by compressing the reflection event in the time or depth domain. The fundamentals of spiking deconvolution, or predictive decomposition, are described in Robinson, "Predictive Decomposition of Seismic Traces", *Geophysics*, Vol. XXII, No. 4 (October 1957), pp. 767–778.

In connection with the preferred embodiment of the invention, it has been observed that spiking deconvolution process 54 significantly improves the method of optimizing the value of scalar A in the combination of the pressure and velocity traces for each receiver location R. It is believed that spiking deconvolution process 54 improves the behavior of the traces through dereverberation of the signals, especially considering the presence of significant coherent shear wave noise encountered upon the velocity traces in typical marine ocean bottom cable seismic surveys. While one may still benefit from the present invention in processes in which spiking deconvolution is omitted, it is believed that inclusion of the spiking deconvolution of process 54 will significantly improve the elimination of ghost reflections, and as such process 54 is included in the preferred embodiment of the present invention.

The conventional processing and filtering of process 40 is concluded, according to this preferred embodiment of the invention, by normal move-out correction process 56, performed in the manner well known in the art to account for offset-dependent time variations among the traces in the common receiver gather.

Referring back to FIG. 5, upon completion of the conventional correction and filtering process 40, the multiple combined source point traces $C_j(t)$ for the j paths in the common receiver gather $G_k$ are then stacked, in process 42. Typically, the multiple combined traces $C_j(t)$ within a limited offset range are stacked with one another to produce a limited-offset stacked trace $C_{sr}(t)$ in process 42. The combined stack trace $C_{sr}(t)$ will approximate a local image of the survey region near its associated receiver location. In other words, stack $C_{sr}(t)$ will be a time domain representation of acoustic energy received at the receiver location associated with gather $G_k$.

Following the stacking of process 42, process 44 is next performed by system computer 30 to provide a measure of the ghost reflection residual in the stacked trace $C_{sr}(t)$ for the common receiver gather $G_k$ under consideration, and for the selected value $A_i$ of the scalar A used in this iteration. Many automated measurement techniques for quantifying the amplitude of the ghost reflection residual in process 44 are known in the art. According to this preferred embodiment of the invention, process 44 is performed by system computer 30 deriving a spectral measurement, such as by way of an autocorrelation, of the trace $C_{sr}(t)$, based upon which the amplitude of harmonics associated with ghost reflection reverberations may be measured. These measurements may then be stored in the memory of system computer 30, or in disk storage 31, as desired.

Decision 45 is then next performed, determining if additional trial values $A_i$ of scalar a remain to be analyzed. If so, the index i is incremented, in process 46, to select a new trial value $A_i$, and processes 38, 40, 42, 44 are repeated for this new scalar A value. It is contemplated that, for typical surveys, the set of trial values for scalar A may be incremented from 0 to 1 by tenths (i.e., 0.0, 0.1, 0.2, et seq.) to provide a thorough set of results for comparison.

Upon the set of scalar values A being exhausted (decision 45 returning a NO), process 48 is next performed either by a human analyst or by an automated comparison performed by system computer 30, to select the optimal value of scalar A for the particular receiver location R corresponding to the common receiver gather under analysis. While not shown in the flow chart of FIG. 5, additional passes through the process may then be made to fine tune the optimal value of scalar A, for example by selecting values between the best two values previously generated, if desired. In either case, the optimal value of scalar A is stored in memory, for example in disk storage device 31, in association with its receiver location R, for later use in the processing of a seismic survey.

Decision 49 is then performed to determine if additional receiver locations in the survey remain to be analyzed for selection of their optimal value of scalar A. If so, control passes to process 50, by way of which system computer 30 selects the next common receiver gather (by incrementing index k) and retrieves the pressure and velocity traces for the shot points corresponding to the next gather $G_k$ from disk storage 31, following which the process of optimizing the scalar value A begins in process 36. Upon completion of optimization for all common receiver gathers in the survey (decision 49 returns a NO), the optimization and combination process according to the preferred embodiment of the invention is complete.

Referring now to FIGS. 7a through 7f, the results of an example of the application of the preferred embodiment of the present invention to actual marine ocean bottom cable survey data will be discussed. The surveys of FIGS. 7a through 7f illustrate the simultaneous application of varying scalar A values for a number of common receiver gathers in a survey, by way of illustration; of course, as discussed above, the present invention may be applied individually to each of the common receiver gathers in the survey. The horizontal axis in each of FIGS. 7a through 7f is the index k for receiver gathers $G_k$, such that the results of approximately 160 common-receiver gathers are shown in these Figures; the vertical axis is, of course, the time dimension. Each of the traces in FIGS. 7a through 7f is an autocorrelation of a combined limited-offset stack trace $C_{sr}(t)$ for a common-receiver gather $C_k$ at the indicated value of k, for a selected value of scalar A. As such, each trace in FIGS. 7a through 7f corresponds to a limited offset (on the order of 500 m) stack of pressure and velocity traces for its particular receiver location, combined using a specified value of scalar A as will be described in detail below. The seismic processing steps described hereinabove, including correction for amplitude delay, spiking deconvolution, and normal moveout correction have been applied in all cases.

FIG. 7a illustrates the autocorrelation of pressure-only stack traces (i.e., the autocorrelation of stack traces $C_{s,k}(t)$ in which A=0.0) from this marine survey. A main lobe ML is indicated in each trace, which corresponds to a strong reflection event from a subsurface geological formation. Each trace $C_{s,k}(t)$ also includes ghost sidelobes GL−, GL+ on either side, in the time domain, of main lobe ML. As described hereinabove relative to FIG. 3a, ghost reflections are evident in pressure traces as negative amplitude sidelobes, consistent with those shown in FIG. 7a. These negative amplitude ghost sidelobes are relatively consistent over the common-receiver gathers shown in FIG. 7a.

Figure 7B:
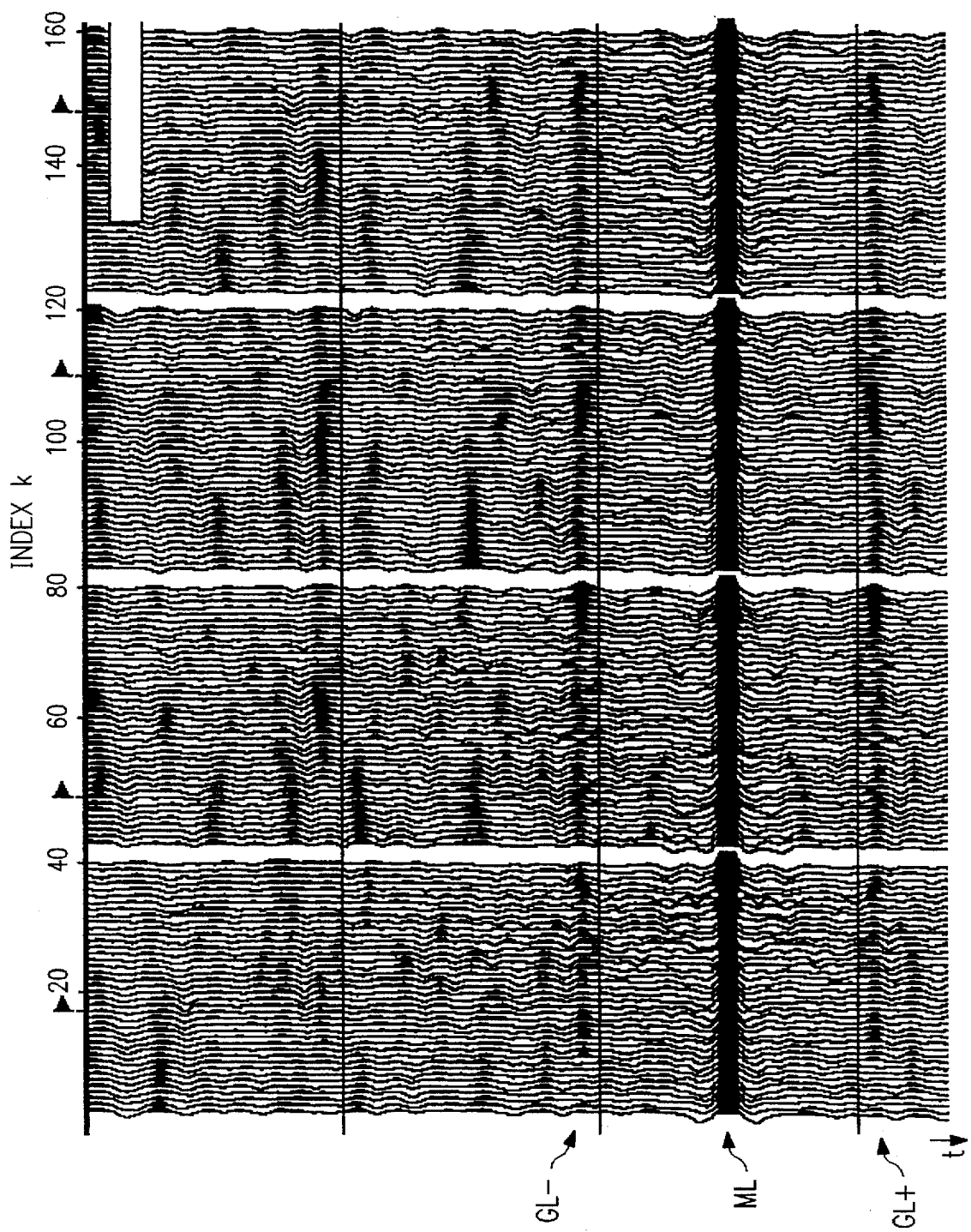

FIG. 7b illustrates the autocorrelations of velocity-only traces (A=1.0) for the same limited-offset stack traces $C_{s,k}(t)$ illustrated in FIG. 7a. Main lobes ML remain evident at approximately the same location along the time domain for each trace. As discussed above relative to FIG. 3b, however, ghost reflections are indicated in velocity traces as positive amplitude sidelobes. As shown in FIG. 7b, ghost reflection positive amplitude sidelobes GL−, GL+ are evident on either side of main lobe ML, at approximately the same location in the time domain as the negative amplitude ghost reflections GL−, GL+ in the pressure-only autocorrelation traces of FIG. 7a.

FIGS. 7c, 7d, 7e, and 7f illustrate the autocorrelations of combined pressure and velocity traces corresponding to those of FIGS. 7a and 7b, at varying values of the scalar A. FIG. 7c shows the autocorrelations for A=0.5; by comparison with FIG. 7a, the ghost reflection sidelobes GL−, GL+ have substantially disappeared in the autocorrelated traces of index k values, while small negative amplitude sidelobes GL−, GL+ are present in the autocorrelated traces for the other common receiver gathers.

Figure 7D:
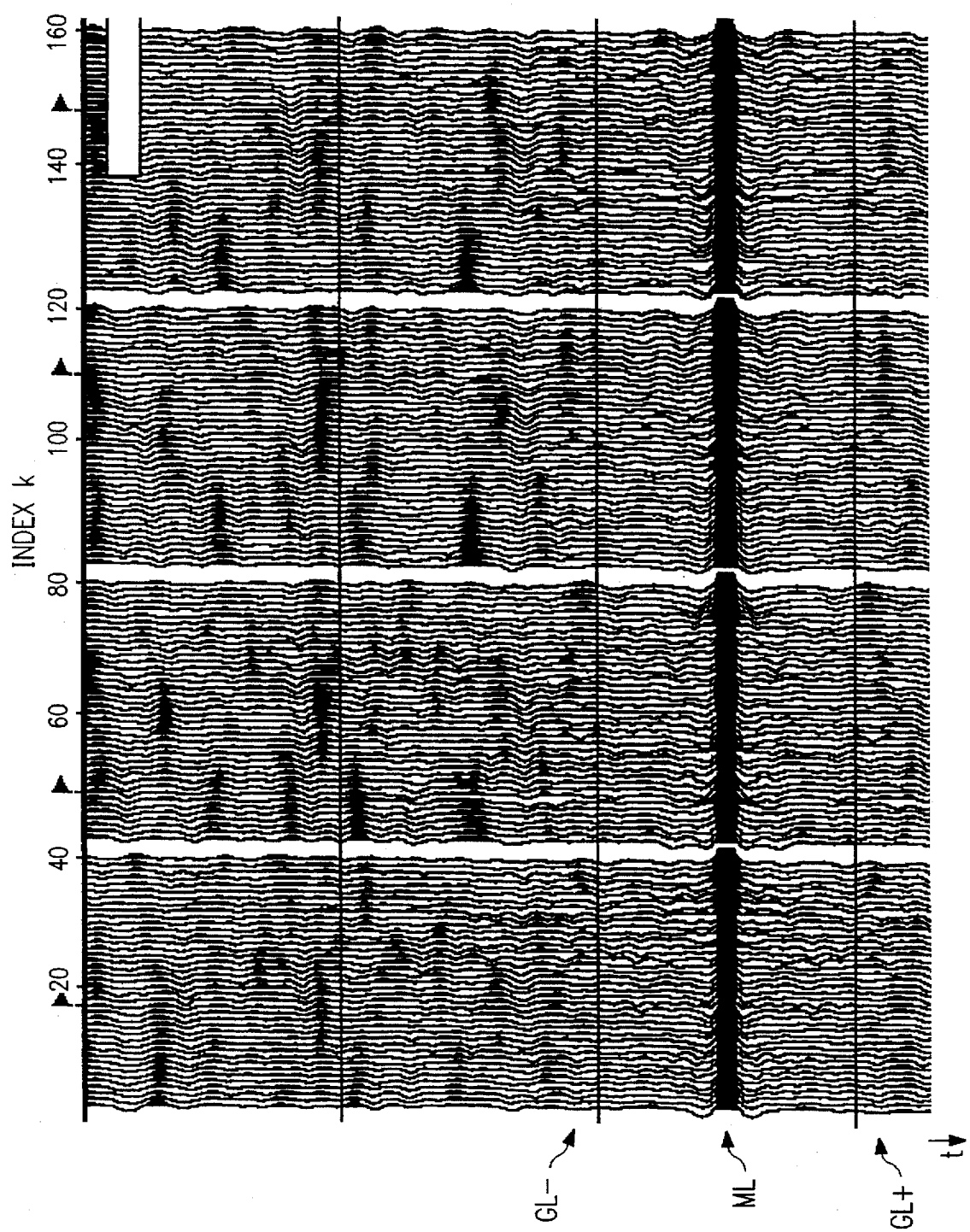

FIG. 7d illustrates the autocorrelations of pressure and velocity traces for A=0.667 (i.e., one part pressure to two parts velocity). Ghost reflection sidelobes GL−, GL+ are substantially removed for this value of A in the autocorrelated traces of index k from approximately 0 to 30, 50 to 70, and 90 to 160. Slight positive amplitude sidelobes GL−, GL+ are evident for the autocorrelated stacked traces from approximately 30 to 50 and 70 to 80, meaning that the scalar A value of 0.6667 is a slight overcorrection for the receiver locations corresponding to these common receiver gathers.

Figure 7E:
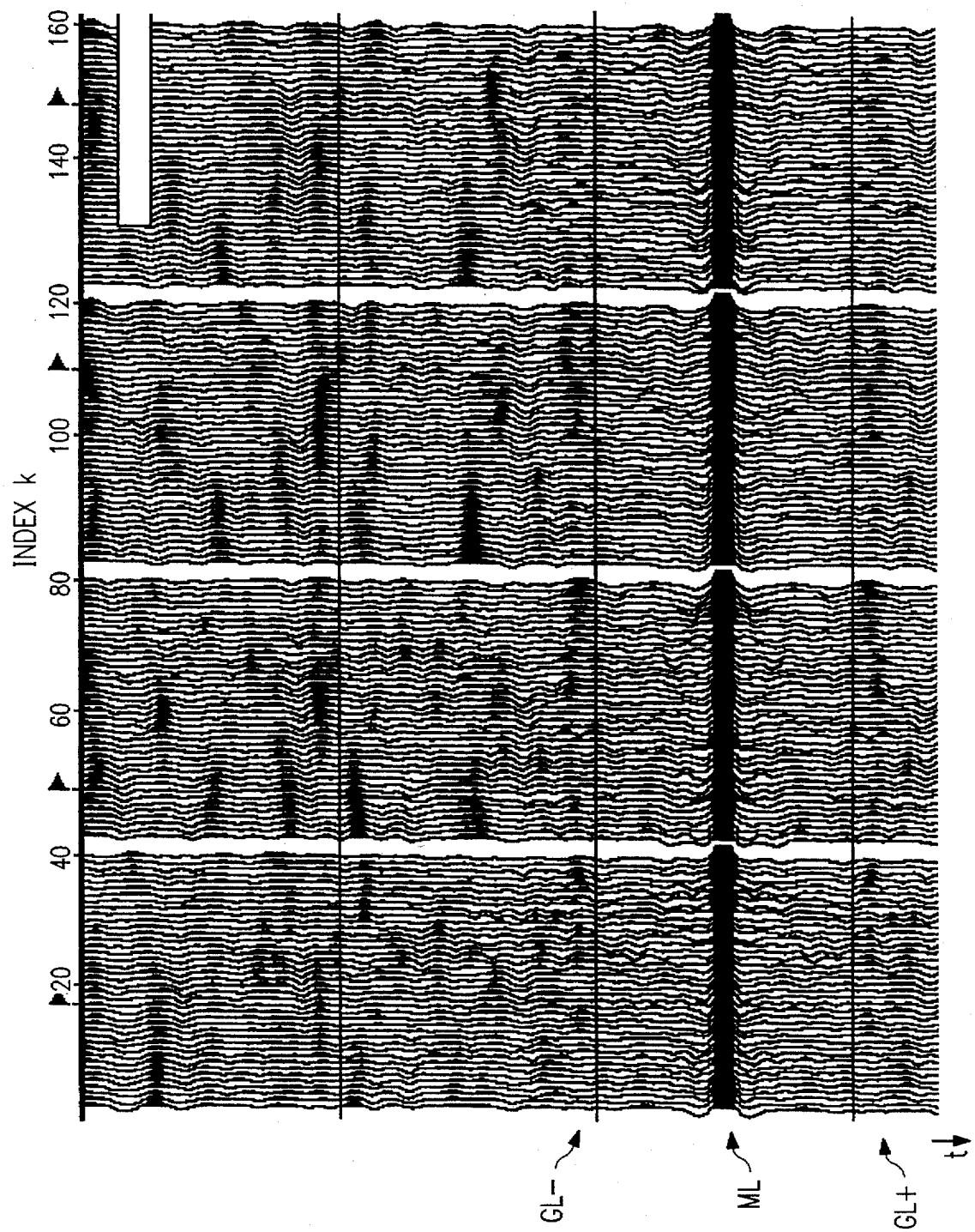

FIG. 7e illustrates the autocorrelations of combined stacked pressure and velocity traces for a scalar A=0.75. By comparison with FIG. 7d, the positive amplitude of ghost reflection sidelobes GR−, GR+ are evident for nearly all traces in the survey, especially for index k values of 60 to 80; the amplitude of ghost reflection sidelobes GR−, GR+ are substantially eliminated for stacked traces of index k from 0 to 10 or so. FIG. 7f illustrates the autocorrelations of pressure and velocity traces combined with A=0.8, in which substantial positive amplitude ghost reflections GR−, GR+ are evident for virtually all of the traces.

As noted above, in a typical marine seismic survey, each receiver location potentially will have a different value for scalar A than others in the survey. According to the example of FIGS. 7a through 7f, the optimal value of scalar A would appear to be approximately 0.667 for receiver locations corresponding to index values of 10 to 30, 50 to 70, and 90 to 160. Receiver locations corresponding to index values of 30 to 50 and 70 to 90 would appear to have an optimal value for scalar A of 0.5, and receiver locations corresponding to index values of 0 to 10 would appear to have an optimal scalar A value of 0.75, based on a cursory review of FIGS. 7a through 7f and identifying the scalar values for which the ghost reflection effects are substantially eliminated.

Some amount of coherence among neighboring receiver locations has been observed in actual surveys, in that adjacent receiver locations in the same line (i.e., in close proximity) generally tend to only have incremental variations in their value for scalar A from its neighbors.

Referring back to FIG. 5, once each receiver location is associated with an optimized value for scalar A (decision 49 returns a NO), the combined traces $C_j(t)$ for each shot point-receiver location combination are stored back in disk storage 31, for use in deriving the survey in the conventional manner, in process 51. For example, common midpoint gathers and stacks of the combined traces (necessarily associated with multiple receiver locations, each having its own optimized value for scalar A), may be performed, followed by normal moveout correction, migration, velocity analysis, and other conventional procedures for developing a 2D or 3D seismic survey. Optimization of the value of scalar A for each of the receiver locations according to the preferred embodiment of the invention provides the important benefit of eliminating the effects of ghost reflections from the water surface from these traces, improving the signal-to-noise ratio, and in turn improving the sensitivity of the marine survey. The results of the survey may then be displayed on an output device of the computer system, such as printer (or plotter) 28 or graphics display device 27.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of filtering the effects of ghost reflections from dual pressure-velocity marine seismic survey signals, comprising the steps of:

retrieving, from computer memory, digital data corresponding to a plurality of pairs of pressure and velocity traces associated with a first receiver location in the survey, each pair of traces corresponding to a common source-receiver path;

combining the pressure and velocity traces of each pair using a first value of a scalar weighting factor;

stacking the combined pressure and velocity traces to form a first stacked trace associated with the first value of the scalar weighting factor;

measuring a residual amplitude of ghost reflections for the first stacked trace;

then adjusting the scalar weighting factor; and after the adjusting step, repeating the combining, stacking, measuring, and adjusting steps for each of a plurality of values of the scalar weighting factor, resulting in a plurality of residual amplitudes of ghost reflections for the stacked traces, each associated with one of the plurality of values of the scalar weighting factor;

storing, in computer memory and associated with the first receiver location in the survey, an optimal value from the plurality of values of the scalar weighting factor, the optimal value associated with the lowest residual amplitude of ghost reflections.

2. The method of claim 1, further comprising:

repeating the retrieving, combining, stacking, measuring, adjusting, and storing steps for each of a plurality of receiver locations in the survey.

3. The method of claim 2, further comprising:

for each of the plurality of receiver locations, combining each pair of pressure and velocity traces using the stored optimal value associated therewith; and displaying a seismic survey based upon the combined pressure and velocity traces.

4. The method of claim 2, wherein the plurality of receiver locations are associated with a plurality of sensor cables.

5. The method of claim 1, further comprising:

before the stacking step, applying a predictive filter to the combined pressure and velocity traces.

6. The method of claim 5, wherein the step of applying a predictive filter comprises applying spiking deconvolution to the combined pressure and velocity traces.

7. The method of claim 5, further comprising:

before the stacking step, applying normal moveout corrections to the combined pressure and velocity traces.

8. The method of claim 5, further comprising:

prior to the stacking step, correcting the combined pressure and velocity traces for amplitude decay.

9. The method of claim 1, wherein the step of measuring a residual amplitude comprises:

autocorrelating the stacked trace.

10. A computer system for filtering ghost reflections from seismic survey signals corresponding to acoustic energy generated by a marine source and detected at a plurality of receiver locations deployed at or near the ocean bottom, such detected energy including acoustic energy reflected from subsurface geological structures and ghost reflections from the water surface, wherein each of the receiver locations comprise a geophone for measuring velocity signals and a hydrophone for measuring pressure signals, comprising:

a computer memory for storing seismic trace data corresponding to pairs of velocity and pressure signals, each pair associated with a common source-receiver path;

a system computer, coupled to the computer memory and to the output device, programmed to perform, for each of the plurality of receiver locations, the steps of:

retrieving, from the memory, digital data corresponding to a plurality of pairs of pressure and velocity traces associated with one of the receiver locations;

for each of a plurality of values of a scalar weighting factor, performing the steps of:

combining the pressure and velocity traces of each pair using the scalar weighting factor;

stacking selected the combined pressure and velocity traces to form a stacked trace; and measuring a residual amplitude of ghost reflections for the stacked trace;

selecting an optimal value from the plurality of values of the scalar weighting factor, the optimal value associated with the lowest residual amplitude of ghost reflections; and storing the combined traces associated with the optimal value of the scalar weighting factor in the memory in association with the receiver location; and an output device, for displaying a seismic survey based upon the stored combined traces associated with the optimal value of the scalar weighting factor for each of the receiver locations.

11. The computer system of claim 10, wherein the measuring step comprises: comprises:

autocorrelating the stacked trace.

12. The computer system of claim 10, wherein the computer is also programmed to perform the step of:

before the stacking step, applying a spiking deconvolution to the combined pressure and velocity traces of each pair.

13. The computer system of claim 12, wherein the computer is also programmed to perform the step of:

before the stacking step, applying normal moveout corrections to the combined pressure and velocity traces.

14. The computer system of claim 12, wherein the computer is also programmed to perform the step of:

correcting the combined pressure and velocity traces for amplitude decay.

15. A computer-readable memory configured so that, when read and used by a computer, the computer is directed to filter the effects of ghost reflections from dual pressure-velocity marine seismic survey signals, said computer directed by a plurality of operations comprising:

retrieving, from computer memory, digital data corresponding to a plurality of pairs of pressure and velocity traces associated with a first receiver location in the survey, each pair of traces corresponding to a common source-receiver path;

for each of a plurality of values of a scalar weighting factor, performing the steps of:

combining the pressure and velocity traces of each pair using the scalar weighting factor;

stacking the combined pressure and velocity traces into a stacked trace; and measuring a residual amplitude of ghost reflections for the stacked trace; and selecting an optimal value from the plurality of values of the scalar weighting factor, the optimal value associated with the lowest residual amplitude of ghost reflections; and storing, in computer memory and associated with the first receiver location, the optimal value of the scalar weighting factor.

16. The computer-readable memory of claim 15, wherein the plurality of operations further comprises:

before the stacking step, applying spiking deconvolution to the combined pressure and velocity traces of each pair.

17. The computer-readable memory of claim 15, wherein the plurality of operations further comprises:

before the stacking step, applying normal moveout corrections to the combined pressure and velocity traces.

18. The computer-readable memory of claim 15, wherein the plurality of operations further comprises:

correcting the combined pressure and velocity traces for amplitude decay.

19. The computer-readable memory of claim 15, wherein the step of measuring a residual amplitude comprises:

autocorrelating the stacked trace.

* * * * *